United States Patent
Song et al.

(10) Patent No.: US 10,612,628 B2
(45) Date of Patent: Apr. 7, 2020

(54) TWO-STAGE TRANSMISSION FOR ELECTRIC VEHICLE

(71) Applicant: KOREA AUTOMOTIVE TECHNOLOGY INSTITUTE, Chungcheongnam-do (KR)

(72) Inventors: Se Il Song, Gangnam-gu Seoul (KR); Chulwoo Moon, Chungcheongnam-do (KR)

(73) Assignee: KOREA AUTOMOTIVE TECHNOLOGY INSTITUTE, Chungcheongnam-Do (KR)

( * ) Notice: Subject to any disclaimer, the term of this patent is extended or adjusted under 35 U.S.C. 154(b) by 0 days.

(21) Appl. No.: 16/085,068

(22) PCT Filed: Mar. 14, 2017

(86) PCT No.: PCT/KR2017/002734
§ 371 (c)(1),
(2) Date: Sep. 14, 2018

(87) PCT Pub. No.: WO2017/160053
PCT Pub. Date: Sep. 21, 2017

(65) Prior Publication Data
US 2019/0072158 A1    Mar. 7, 2019

(30) Foreign Application Priority Data
Mar. 16, 2016 (KR) .................. 10-2016-0031634

(51) Int. Cl.
*F16H 3/78* (2006.01)
*F16H 3/48* (2006.01)
(Continued)

(52) U.S. Cl.
CPC ............ *F16H 3/78* (2013.01); *B60L 15/2054* (2013.01); *B60L 50/50* (2019.02); *F16D 11/14* (2013.01);
(Continued)

(58) Field of Classification Search
None
See application file for complete search history.

(56) References Cited

U.S. PATENT DOCUMENTS 2,244,668 A * 6/1941 Barnes ...................... F16H 3/78
475/312
2,599,559 A * 6/1952 Kelbel ..................... F16H 3/663
475/283
(Continued)

FOREIGN PATENT DOCUMENTS

JP      2005-030430 A     2/2005
JP      2015-209907 A    11/2015
(Continued)

*Primary Examiner* — Colby M Hansen
(74) *Attorney, Agent, or Firm* — Baker & Hostetler LLP (57) ABSTRACT

A two-stage transmission for an electric vehicle of the present invention comprises: a gearbox unit; a driving unit for providing power into the gearbox unit; a sun gear unit embedded in the gearbox unit and rotated by being axially connected to the driving unit, a planetary gear unit embedded in the gearbox unit, and provided in engagement with an outer side part of the sun gear unit; a carrier unit embedded in the gearbox unit and rotatably supporting the planetary gear unit; a ring gear unit embedded in the gearbox unit, and provided on the outer side of the carrier unit and engaged with the planetary gear unit; a first synchro unit axially connected to the driving unit so as to rotate together with the sun gear unit, and selectively connected to the carrier unit so as to adjust variable speeds; and a second synchro unit (Continued)

mounted in the gearbox unit, and selectively coupled to the ring gear unit so as to adjust variable speeds.

6 Claims, 6 Drawing Sheets

(51) Int. Cl.
| | |
|---|---|
| *B60L 50/50* | (2019.01) |
| *F16D 11/14* | (2006.01) |
| *F16D 23/02* | (2006.01) |
| *F16H 3/54* | (2006.01) |
| *B60L 15/20* | (2006.01) |
| *F16D 63/00* | (2006.01) |
| *B60T 1/06* | (2006.01) |
| *B60T 1/00* | (2006.01) |
| *F16D 11/00* | (2006.01) |

(52) U.S. Cl.
CPC ............. *F16D 23/02* (2013.01); *F16H 3/48* (2013.01); *F16H 3/54* (2013.01); *B60L 2240/486* (2013.01); *B60T 1/005* (2013.01); *B60T 1/062* (2013.01); *B60Y 2200/91* (2013.01); *F16D 63/006* (2013.01); *F16D 2011/002* (2013.01); *F16H 2200/0034* (2013.01); *F16H 2200/2005* (2013.01); *F16H 2200/2064* (2013.01); *F16H 2200/2094* (2013.01); *Y02T 10/644* (2013.01); *Y02T 10/7275* (2013.01)

(56) References Cited

U.S. PATENT DOCUMENTS

| | | | | |
|---|---|---|---|---|
| 3,426,623 | A * | 2/1969 | Abbott | F16D 23/0606 475/159 |
| 9,194,462 | B2 * | 11/2015 | Blum | F16H 3/44 |
| 2004/0106492 | A1 * | 6/2004 | Alfredsson | F16D 23/06 475/303 |
| 2010/0162849 | A1 * | 7/2010 | Love | F16D 11/14 74/718 |
| 2016/0356341 | A1 * | 12/2016 | Flemming | F16D 28/00 |

FOREIGN PATENT DOCUMENTS

| | | |
|---|---|---|
| KR | 10-2004-0033701 A | 4/2004 |
| KR | 2006-0103258 A | 9/2006 |
| KR | 10-2013-0104368 A | 9/2013 |
| KR | 10-2014-0031379 A | 3/2014 |
| KR | 10-2016-0005209 A | 1/2016 |

* cited by examiner

TWO-STAGE TRANSMISSION FOR ELECTRIC VEHICLE

CROSS-REFERENCE TO RELATED APPLICATIONS

This application is a National Stage of International patent application PCT/KR2017/002734, filed on Mar. 14, 2017, which claims priority to foreign Korean patent application No. KR 10-2016-0031634, filed on Mar. 16, 2016, the disclosures of which are incorporated by reference in their entirety.

FIELD OF THE INVENTION

The present invention relates to a two-stage transmission for an electric vehicle, and more particularly, to an electric-vehicle-specific two-stage transmission capable of reducing maintenance costs and improving productivity by decreasing the number of components used for two-stage shifts.

BACKGROUND

Generally, an electric vehicle uses electricity as a fuel and uses a battery as a power source, unlike a gasoline engine. Such an electric vehicle has recently been spotlighted as a pollution-free vehicle, which does not discharge exhaust gas. An electric vehicle has good motor characteristics and uses a reducer with a single gear ratio to adjust the speed of the vehicle.

Conventionally, when only motor torque is utilized or when only an electric reducer is used, motor capacity relatively increases, and production costs increase accordingly. Therefore, there is a need to solve the above problems.

The background of the present invention is disclosed in Korean Patent Publication No. 2004-0033701 (published on Apr. 28, 2004 and entitled "TRANSMISSION OF HYBRID ELECTRIC VEHICLE).

SUMMARY OF THE INVENTION

The present invention has been made in order to solve the above-described problem and is directed to providing an electric-vehicle-specific two-stage transmission capable of reducing production costs by using a motor with small capacity while satisfying driving conditions of electric vehicles.

A two-stage transmission for an electric vehicle according to the present invention includes a gearbox unit; a driving unit configured to provide power into the gearbox unit; a sun gear unit embedded in the gearbox unit and axially connected to the driving unit to rotate; a planetary gear unit embedded in the gearbox unit and installed in engagement with an outer side portion of the sun gear unit; a carrier unit embedded in the gearbox unit and configured to rotatably support the planetary gear unit; a ring gear unit embedded in the gearbox unit, installed on an outer side of the carrier unit, and engaged with the planetary gear unit; a first synchro unit axially connected to the driving unit to rotate together with the sun gear unit and selectively connected to the carrier unit to adjust shifting; and a second synchro unit mounted in the gearbox unit and selectively coupled to the ring gear unit to adjust shifting.

According to the present invention, the driving unit includes an electric motor unit operated when electricity is supplied; and a driving shaft unit connected to the electric motor unit to rotate and connected to the sun gear unit.

According to the present invention, the first synchro unit includes a first synchro hub unit installed apart from the carrier unit and connected to the driving shaft unit; and a first synchro sleeve unit slidably installed on an outer side of the first synchro hub unit to selectively connect the first synchro hub unit and the carrier unit.

According to the present invention, when the first synchro hub unit and the carrier unit are connected to each other by the first synchro sleeve unit, the carrier unit is synchronized with the first synchro hub unit so that as the first synchro hub unit rotates in one direction, the carrier unit rotates in the one direction.

According to the present invention, the two-stage transmission further includes a clutch unit installed between the electric motor unit and the sun gear unit and configured to control power delivered through the driving shaft unit.

According to the present invention, the two-stage transmission further includes a control unit configured to control operations of the first synchro unit, the second synchro unit, and the clutch unit.

According to the present invention, the second synchro unit is fastened to the gearbox unit, slidably installed, and capable of being coupled to or decoupled from the ring gear unit.

According to the present invention, when the second synchro unit is coupled to the ring gear unit, rotation of the ring gear unit is restricted.

According to the present invention, when the first synchro unit is disconnected from the carrier unit and the second synchro unit is coupled to the ring gear unit, a first shift stage is implemented.

According to the present invention, when the first synchro unit is connected to the carrier unit and the second synchro unit is decoupled from the ring gear unit, a second shift stage is implemented.

According to the present invention, when the first synchro unit is connected to the carrier unit and the second synchro unit is coupled to the ring gear unit, a parking mode is implemented.

DETAILED DESCRIPTION

Hereinafter, an embodiment of an electric-vehicle-specific two-stage transmission according to the present invention will be described with reference to the accompanying drawings. In the drawings, thicknesses of lines or sizes of elements may be exaggerated for clarity and convenience. Also, the following terms are defined considering functions of the present invention, and may be differently defined depending on a user, the intent of an operator, or a custom. Therefore, the terms should be defined based on overall contents of the specification.

Figure 1:
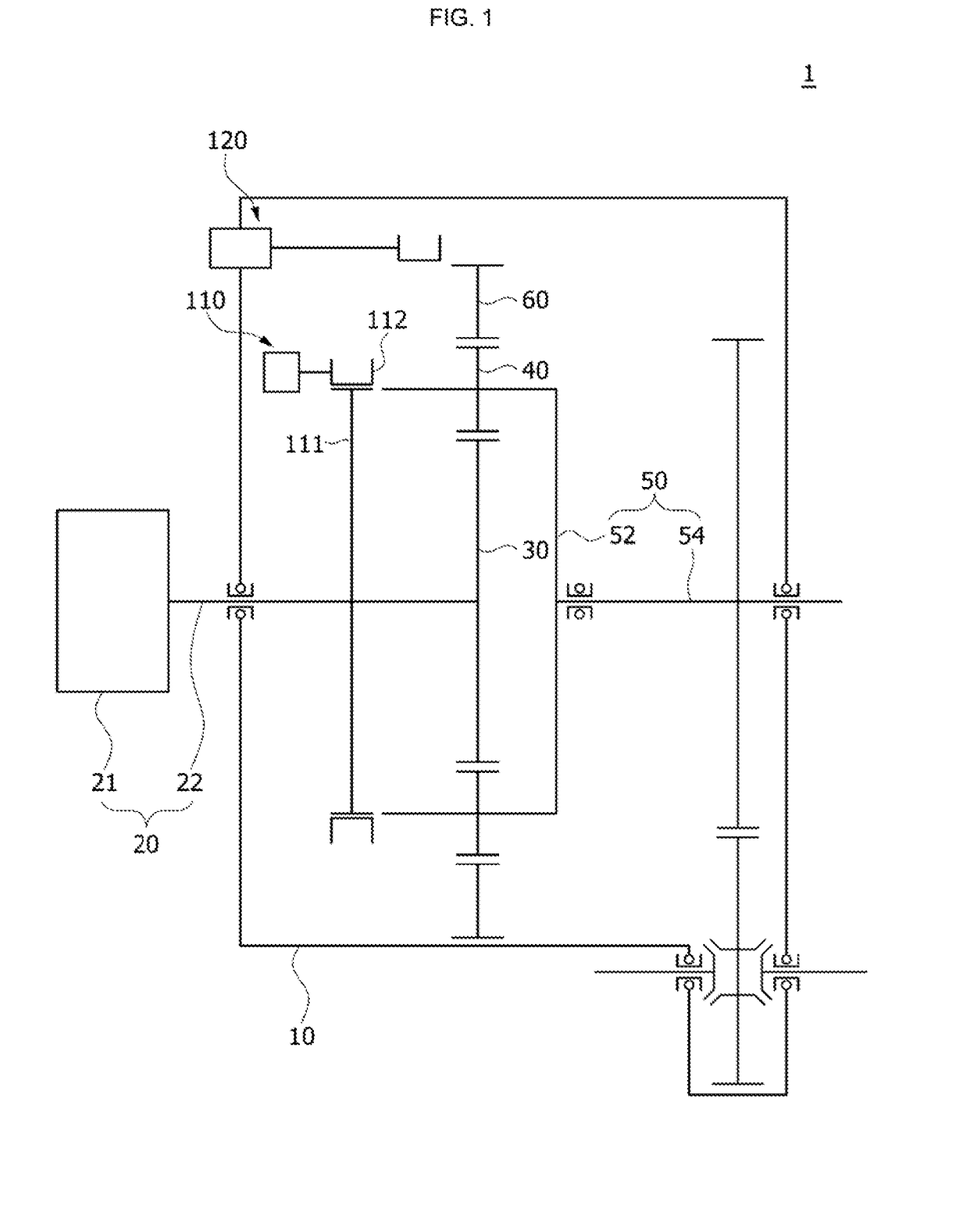
FIG. 1 is a schematic diagram showing an electric-vehicle-specific two-stage transmission according to an embodiment of the present invention.

FIG. 1 is a schematic diagram showing an electric-vehicle-specific two-stage transmission according to an embodiment of the present invention. Referring to FIG. 1, an electric-vehicle-specific two-stage transmission 1 according to an embodiment of the present invention includes a gearbox unit 10, a driving unit 20, a sun gear unit 30, a planetary gear unit 40, a carrier unit 50, a ring gear unit 60, a first synchro unit 110, and a second synchro unit 120.

The gearbox unit 10 is installed in a vehicular body, and the driving unit 20 provides power into the gearbox unit 10. The sun gear unit 30, the planetary gear unit 40, the carrier unit 50, the ring gear unit 60, the first synchro unit 110, and the second synchro unit 120 are embedded in the gearbox unit 10.

The driving unit 20 provides power to the electric vehicle. The driving unit 20 includes an electric motor unit 21 configured to operate when electricity is supplied and a driving shaft unit 22 connected to the electric motor unit 21 to rotate.

In this embodiment, the driving unit 20 may use the electric motor unit 21 and also may use a power supply device other than the electric motor unit 21. The driving shaft unit 22 is connected to electric motor unit 21. When the electric motor unit 21 operates, the driving shaft unit 22 rotates, and the sun gear unit 30, which is connected to the driving shaft unit 22, also rotates.

The sun gear unit 30 is axially connected to the driving unit 20 to rotate. When rotational force is provided by the driving unit 20 in one direction, the sun gear unit 30 also rotates in the one direction. When rotational force is provided by the driving unit 20 in another direction, the sun gear unit 30 also rotates in the other direction.

The sun gear unit 30 may be formed in various shapes without departing from the spirit of the present invention as long as it is axially connected to the driving unit 20 to rotate. The sun gear unit 30 may be axially connected to the driving unit 20 directly or indirectly through another link member. Various other modifications are possible.

The planetary gear unit 40 is installed in engagement with an outer side of the sun gear unit 30, and the carrier unit 50 supports the planetary gear unit 40 such that the planetary gear unit 40 may rotate. The ring gear unit 60 is installed on an outer side of the carrier unit 50 and is engaged with the planetary gear unit 40.

The planetary gear unit 40 installed in engagement with the outer side of the sun gear unit 30 includes a plurality of planetary gear units 40 spaced a predetermined distance from one another and installed on the outer side of the sun gear unit 30. The planetary gear unit 40 moves along the outer side of the sun gear unit 30 while rotating in engagement with the outer side of the sun gear unit 30. Since the planetary gear unit 40 is rotatably installed in the carrier unit 50, the carrier unit 50 rotates as the planetary gear unit 40 rotates.

The carrier unit 50 may be formed in various shapes without departing from the spirit of the present invention as long as the carrier unit 50 rotatably supports the planetary gear unit 40. According to this embodiment, the carrier unit 50 may include a body member 52 formed in a U-shaped cross section in which the planetary gear unit 40 is rotatably installed and an output shaft 54 connected to the center of rotation of the body member 52.

The body member 52 and the output shaft 54 rotate simultaneously. The sun gear unit 30 is installed inside the body member 52, and the first synchro unit 110 is installed at an opening part of the body member 52.

The ring gear unit 60 is installed on an outer side of the carrier unit 50, and a saw-tooth-shaped part is formed along an inner side portion of the ring gear unit 60. The planetary gear unit 40 is engaged with the inner side portion of the ring gear unit 60. As the sun gear unit 30 rotates, the planetary gear unit 40 rotates and moves along the ring gear unit 60.

The first synchro unit 110 is axially connected to the driving unit 20. The first synchro unit 110 rotates together with the sun gear unit 30, and adjusts shifting by being coupled to, or decoupled from, the carrier unit 50.

The first synchro unit 110 according to an embodiment of the present invention includes a first synchro hub unit 111 and a first synchro sleeve unit 112. The first synchro hub unit 111 is spaced apart from the carrier unit 50 and connected to the driving shaft unit 22. The first synchro sleeve unit 112 is slidably installed on an outer side of the first synchro hub unit 111 to selectively connect the first synchro hub unit 111 and the carrier unit 50. When the first synchro hub unit 111 and the carrier unit 50 are connected by the first synchro sleeve unit 112, the first synchro hub unit 111 and the carrier unit 50 are synchronized in rotation.

The first synchro hub unit 111 is installed in front of the carrier unit 50 (on the left in FIG. 1) and fastened to the driving shaft unit 22. As the driving shaft unit 22 rotates, the sun gear unit 30 also rotates. A saw-tooth-shaped part is formed at an inner side portion of the first synchro sleeve unit 112 opposite to the first synchro hub unit 111, and a saw-tooth-shaped part is formed on the outer side portion of the first synchro hub unit 111 and on the outer side portion of the carrier unit 50. Thus, the inner side portion of the first synchro sleeve unit 112, the outer side portion of the first synchro hub unit 111, and/or the outer side portion of the carrier unit 50 may be coupled to each other.

Various jointing devices may be used as the first synchro sleeve unit 112 without departing from the spirit of the present invention as long as the devices can connect the first synchro hub unit 111 and the carrier unit 50 to synchronize the rotation of the first synchro hub unit 111 with the rotation of the carrier unit 50.

The second synchro unit 120 is mounted in the gearbox unit 10 and selectively coupled to the ring gear unit 60. That is, the second synchro unit 120 adjusts shifting by being coupled to or decoupled from the ring gear unit 60. While fastened to the gearbox unit 10, the second synchro unit 120 is slidably installed and selectively coupled to the ring gear unit 60. When the second synchro unit 120 is coupled to the ring gear unit 60, the rotation of the ring gear unit 60 may be restricted.

Figure 2:
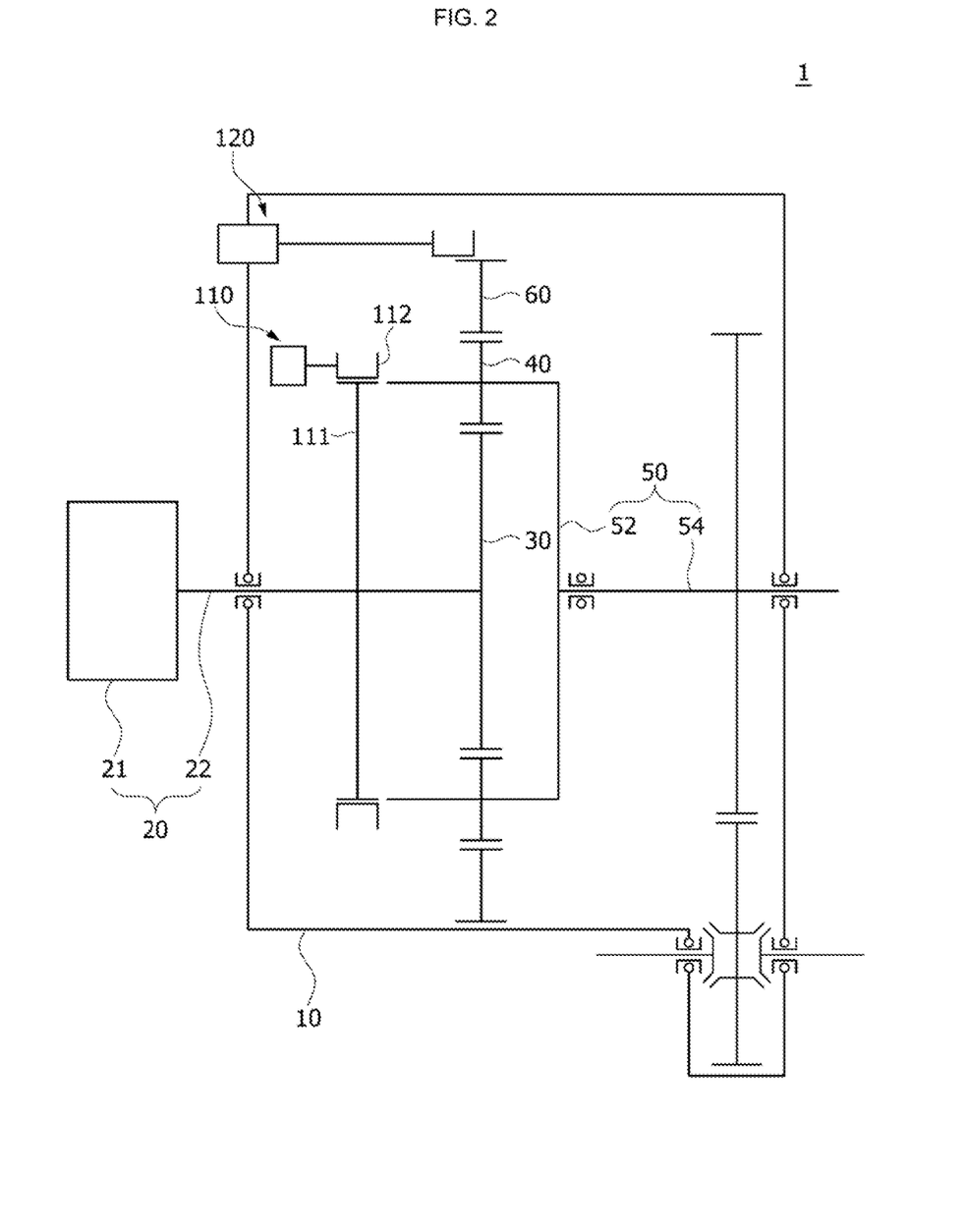
FIG. 2 is a schematic diagram showing a state in which the electric-vehicle-specific two-stage transmission according to an embodiment of the present invention is operating in a first stage.

FIG. 2 is a schematic diagram showing a state in which the electric-vehicle-specific two-stage transmission according to an embodiment of the present invention is operating in a first stage.

Referring to FIG. 2, in the first shift stage, the first synchro unit 110 is disconnected from the carrier unit 50, and the second synchro unit 120 is coupled to the ring gear unit 60. That is, when the first synchro unit 110 is spaced apart from the carrier unit 50, the ring gear unit 60 rotates in one direction as the sun gear unit 30 rotates in the one direction.

In this case, the rotation of the ring gear unit 60 in one direction, for example, clockwise rotation is restrained by the second synchro unit 120.

In this case, when it is assumed that the driving shaft unit 22 rotates clockwise by operation of the electric motor unit 21, the sun gear unit 30 rotates clockwise together with the driving shaft unit 22, and the planetary gear unit 40, which is engaged with the sun gear unit 30, rotates counterclockwise.

In this case, since the ring gear unit 60 is restrained by the second synchro unit 120, the planetary gear unit 40 moves along the ring gear unit 60. That is, the planetary gear unit 40 revolves clockwise, and the carrier unit 50 rotates in the same direction as the revolving direction of the planetary gear unit 40 along with the planetary gear unit 40.

Since the planetary gear unit 40 revolves around the sun gear unit 30 while rotating counterclockwise, the rotational speed of the carrier unit 50, which rotates along with the planetary gear unit 40, is lower than that of the sun gear unit 30. That is, when the sun gear unit 30 is driven while the rotation of the ring gear unit 60 is restrained, the carrier unit 50 decelerates and rotates in the same direction. Thus, the first-stage shift of the electric-vehicle-specific two-stage transmission 1 is performed.

When the driving shaft unit 22 rotates clockwise, a first-stage shift may be made for forward movement. When the driving shaft unit 22 rotates counterclockwise, a first-stage shift may be made for backward movement.

Figure 3:
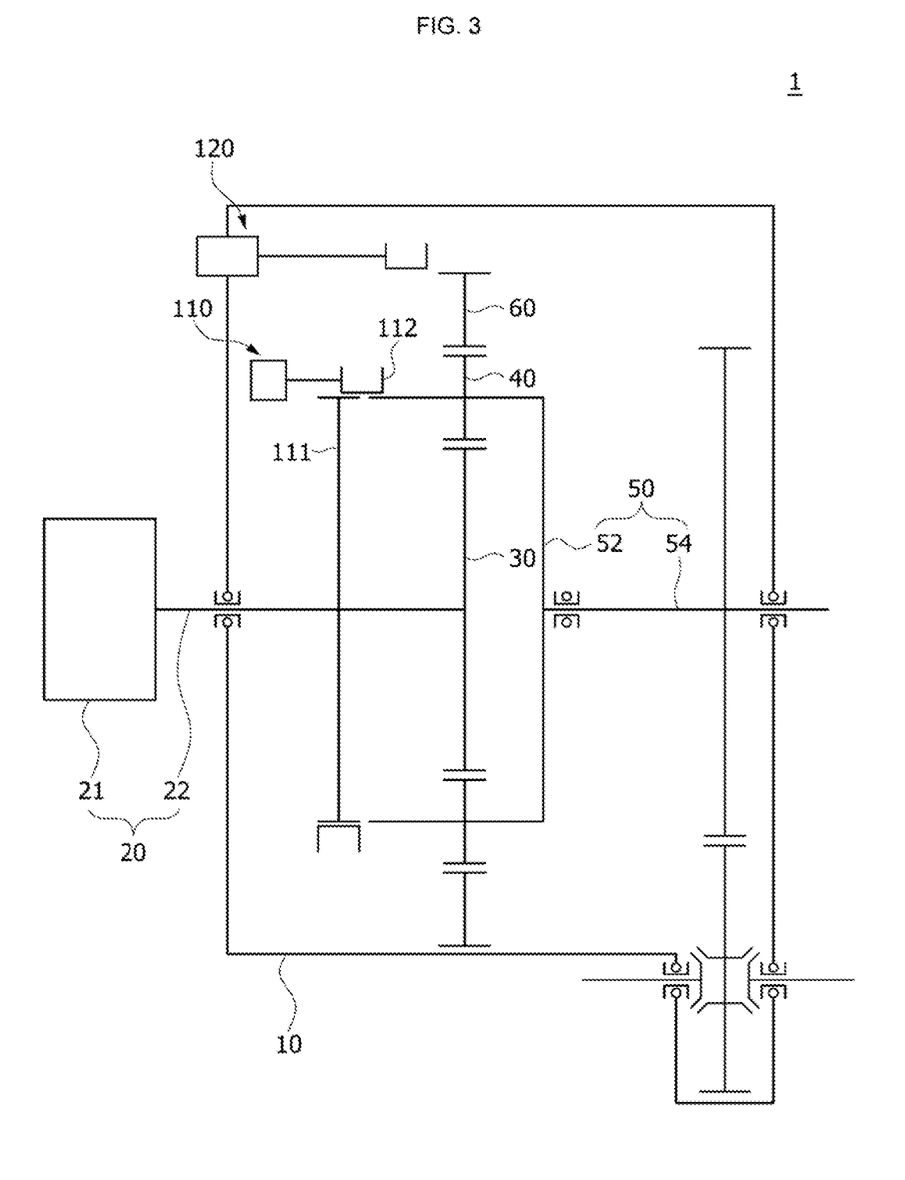
FIG. 3 is a schematic diagram showing a state in which the electric-vehicle-specific two-stage transmission according to an embodiment of the present invention is operating in a second stage.

FIG. 3 is a schematic diagram showing a state in which the electric-vehicle-specific two-stage transmission according to an embodiment of the present invention is operating in a second stage.

Referring to FIG. 3, in the second shift stage, the first synchro unit 110 is connected to the carrier unit 50, and the second synchro unit 120 is decoupled from the ring gear unit 60. That is, when the first synchro sleeve unit t112 moves and connects the first synchro hub unit 111 and the body member 52 of the carrier unit 50, the first synchro hub unit 111 and the carrier unit 50 are synchronized with each other to rotate in the same direction.

In this situation, when it is assumed that the electric motor unit 21 operates and the driving shaft unit 22 rotates clockwise, the sun gear unit 30 rotates along with the driving shaft unit 22 and the first synchro hub unit 111. Since the first synchro hub unit 111 and the body member 52 of the carrier unit 50 are connected by the first synchro sleeve unit 112, the first synchro hub unit 111 and the first synchro sleeve unit 112 also rotate.

When the sun gear unit 30 rotates clockwise while the sun gear unit 30 and the carrier unit 50 are coupled by operation of the first synchro unit 110, the planetary gear unit 40 engaged with the sun gear unit 30 cannot rotate and revolve counterclockwise because the carrier unit 50 is coupled to the sun gear unit 30 so that the carrier unit 50 cannot move. Accordingly, the rotation and the revolution of the planetary gear unit 40 are restrained. That is, since the planetary gear unit 40, the carrier unit 50, and the first synchro hub unit 111 form one body with, and rotate together with, the sun gear unit 30, the second-stage shift of the electric-vehicle-specific two-stage transmission 1 is performed.

When the driving shaft unit 22 rotates clockwise, a second-stage shift may be made for forward movement. When the driving shaft unit 22 rotates counterclockwise, a second-stage shift may be made for backward movement.

Figure 4:
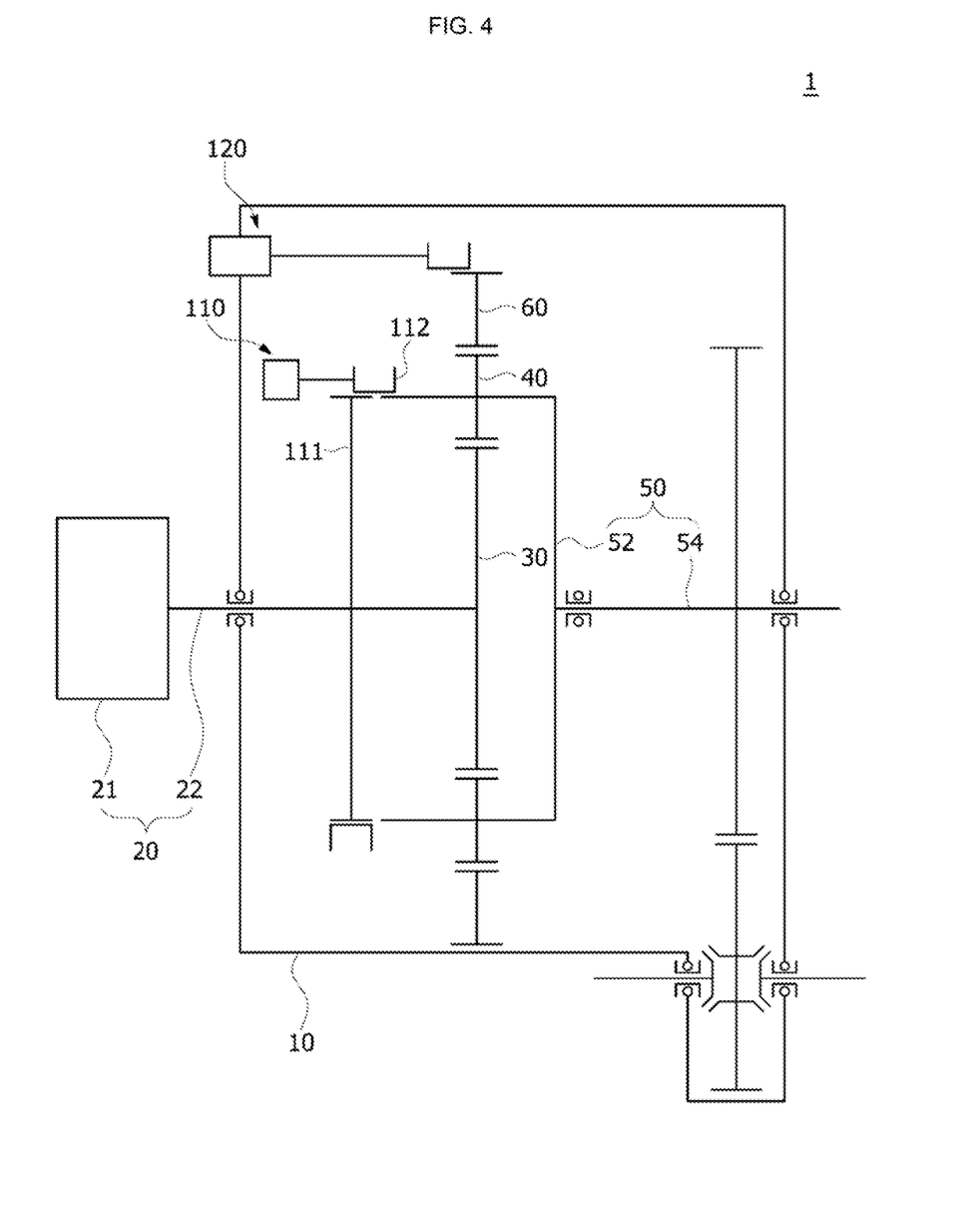
FIG. 4 is a schematic diagram showing a state in which the electric-vehicle-specific two-stage transmission according to an embodiment of the present invention is in a parking mode.

FIG. 4 is a schematic diagram showing a state in which the electric-vehicle-specific two-stage transmission according to an embodiment of the present invention is in a parking mode.

Referring to FIG. 4, in the parking mode, the first synchro unit 110 is connected to the carrier unit 50, and the second synchro unit 120 is coupled to the ring gear unit 60. That is, when the first synchro unit 110 is coupled to the carrier unit 50 and the second synchro unit 120 is coupled to the ring gear unit 60, the ring gear unit 60 is restrained by the gearbox unit 10, and the rotation of the carrier unit 50 and the planetary gear unit 40 connected to the ring gear unit 60 are restricted.

Figure 5:
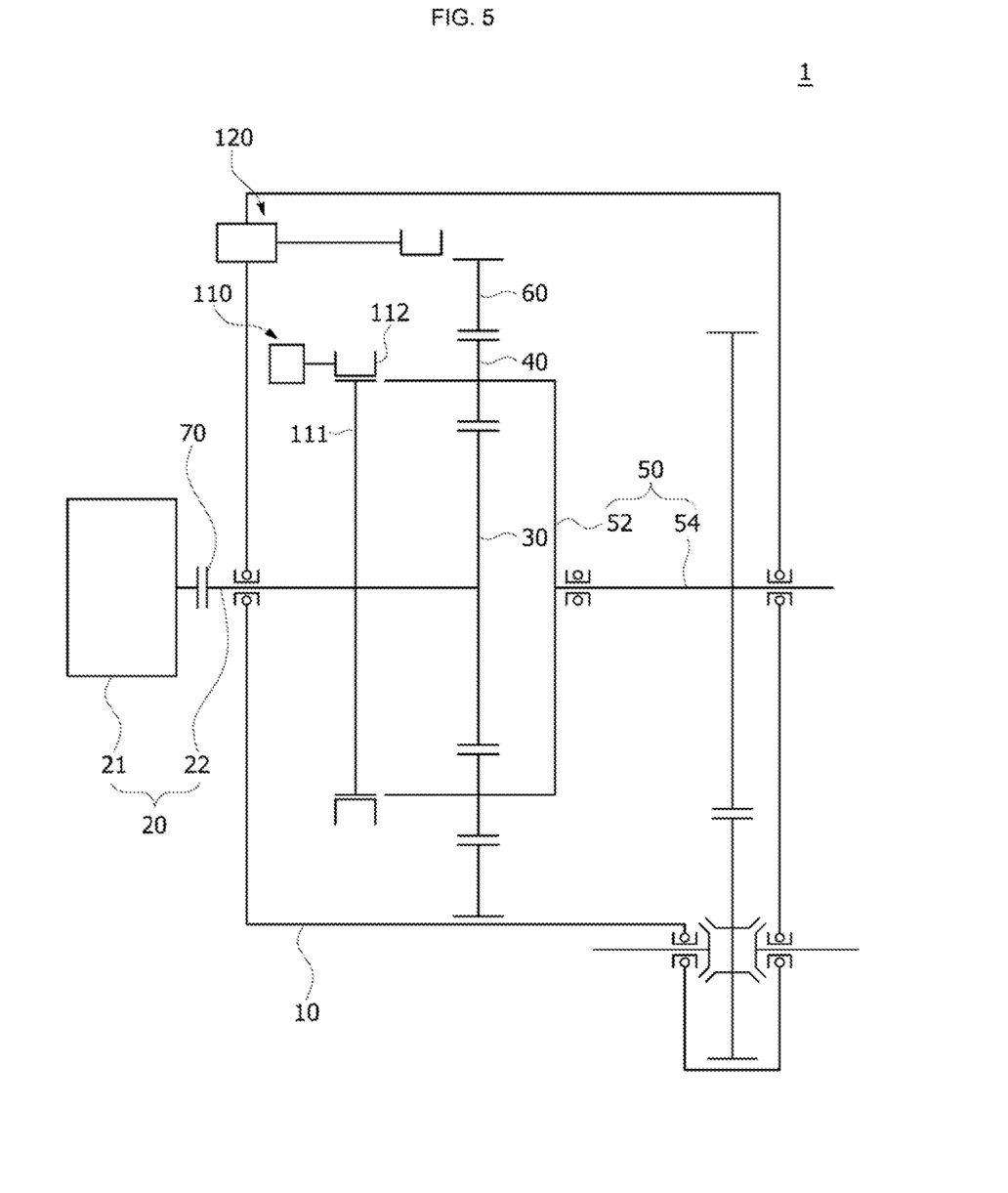
FIG. 5 is a schematic diagram showing a configuration in which a clutch unit and a control unit are added to the electric-vehicle-specific two-stage transmission according to an embodiment of the present invention.

FIG. 5 is a schematic diagram showing a configuration in which a clutch unit and a control unit are added to the electric-vehicle-specific two-stage transmission according to an embodiment of the present invention.

Referring to FIG. 5, the electric-vehicle-specific two-stage transmission 1 according to an embodiment of the present invention may further include a clutch unit 70. The clutch unit 70 is installed between the electric motor unit 21 and the sun gear unit 30 to control delivery of power through the driving shaft unit 22.

As an example, when the first-stage shift is switched into the second-stage shift, the clutch unit 70 may operate to cut off power delivered through the driving shaft unit 22, thus reducing shift shock. That is, when the first-stage shift in which the first synchro unit 110 is spaced apart from the carrier unit 50 is switched into the second-stage shift in which the first synchro unit 110 and the carrier unit 50 are connected to each other, the clutch unit 70 cuts off power delivered through the driving shaft unit 22.

When the second-stage shift is complete, the clutch unit 70 operates to allow delivery of power through the driving shaft unit 22. Thus, the sun gear unit 30 rotates as the driving shaft unit 22 rotates. The clutch unit 70 may operate in a manual mode using a user's operational force or operate in an automatic mode using a driving device.

Figure 6:
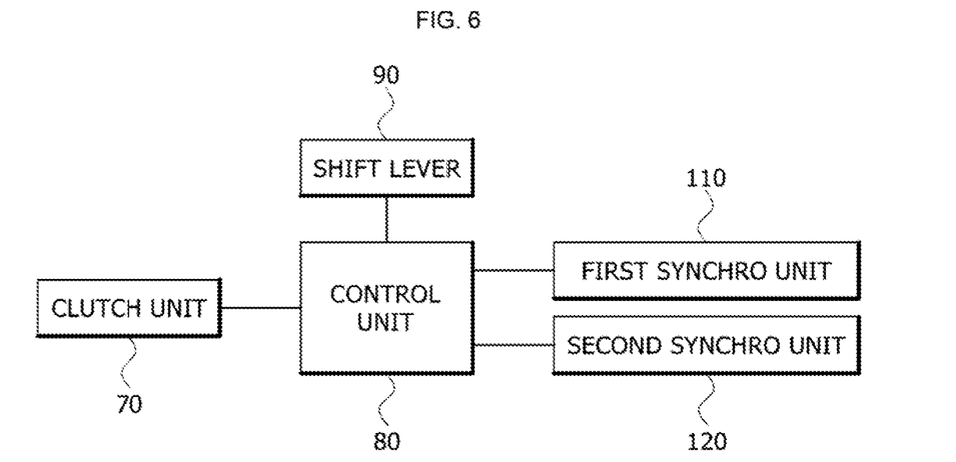
FIG. 6 is a schematic diagram showing a connection relation of the control unit in the electric-vehicle-specific two-stage transmission according to an embodiment of the present invention.

FIG. 6 is a schematic diagram showing a connection relation of the control unit in the electric-vehicle-specific two-stage transmission according to an embodiment of the present invention.

Referring to FIGS. 5 and 6, the electric-vehicle-specific two-stage transmission 1 according to an embodiment of the present invention may further include a control unit 80 that controls operations of the first synchro unit 110, the second synchro unit 120, and the clutch unit 70. The control unit 80 may detect the location of a shift lever 90 to control the first synchro unit 110, the second synchro unit 120, and the clutch unit 70.

As an example, when the shift lever 90 is placed at a first-stage shift point, the first synchro unit 110 is spaced apart from the carrier unit 50 under the control of the control unit 80. Also, the second synchro unit 120 is coupled to the ring gear unit 60 to restrain the ring gear unit 60.

In this situation, when the shift lever 90 is placed at a second-stage shift point for the purpose of second-stage shift, the synchro unit 110 moves toward the carrier unit 50 under the control of the control unit 80 such that the first synchro unit 110 is connected to and synchronized with the carrier unit 50. Also, the second synchro unit 120 is spaced apart from and decoupled from the ring gear unit 60.

While the shift lever 90 is moved between the first stage and the second stage for the purpose of shifting, the clutch unit 70 restricts the delivery of power of the driving shaft unit 22 under the control of the control unit 80.

When the shift lever 90 is placed in the parking mode, the first synchro unit 110 is connected to the carrier unit 50 and the second synchro unit 120 is coupled to the ring gear unit 60 under the control of the control unit 80. In this case, the clutch unit 70 may cut off power delivered from the driving shaft unit 22 under the control of the control unit 80.

The electric-vehicle-specific two-stage transmission 1 according to the present invention can reduce a weight thereof by applying a planetary gear to decrease the volume and weight of a transmission device.

The electric-vehicle-specific two-stage transmission 1 according to the present invention can perform two-stage shifts and also implement the parking mode through the first synchro unit 110 and the second synchro unit 120.

In the electric-vehicle-specific two-stage transmission 1 according to the present invention, the clutch unit 70 can selectively cut off delivery of power, thereby mitigating shock at a shifting point.

The electric-vehicle-specific two-stage transmission 1 according to the present invention can automatically perform shifting under the control of the control unit 80.

While the present invention has been described with reference to an embodiment shown in the accompanying drawings, it should be understood by those skilled in the art that this embodiment is merely illustrative of the invention and that various modifications and equivalents may be made without departing from the spirit and scope of the invention. Therefore, the technical scope of the present invention should be defined by the following claims.

The invention claimed is:

1. A two-stage transmission for an electric vehicle, the two-stage transmission comprising:
   a gearbox unit;
   a driving unit configured to provide power into the gearbox unit;
   a sun gear unit embedded in the gearbox unit and axially connected to the driving unit to rotate;
   a planetary gear unit embedded in the gearbox unit and installed in engagement with an outer side portion of the sun gear unit;
   a carrier unit embedded in the gearbox unit and configured to rotatably support the planetary gear unit;
   a ring gear unit embedded in the gearbox unit, installed on an outer side of the carrier unit, and engaged with the planetary gear unit;
   a first synchro unit axially connected to the driving unit to rotate together with the sun gear unit and selectively connected to the carrier unit to adjust shifting; and
   a second synchro unit mounted in the gearbox unit and selectively coupled to the ring gear unit to adjust shifting,
   wherein the driving unit comprises:
   an electric motor unit operated when electricity is supplied; and
   a driving shaft unit connected to the electric motor unit to rotate and connected to the sun gear unit,
   wherein the first synchro unit comprises:
   a first synchro hub unit installed apart from the carrier unit and connected to the driving shaft unit, and
   a first synchro sleeve unit slidably installed on an outer side of the first synchro hub unit to selectively connect the first synchro hub unit and the carrier unit,
   wherein the second synchro unit is fastened to the gearbox unit, wherein when the second synchro unit is coupled to the ring gear unit, rotation of the ring gear unit is restricted,
   wherein when the first synchro unit is connected to the carrier unit and the second synchro unit is coupled to the ring gear unit, a parking mode is implemented.

2. The two-stage transmission of claim 1, wherein when the first synchro hub unit and the carrier unit are connected to each other by the first synchro sleeve unit, the carrier unit is synchronized with the first synchro hub unit so that as the first synchro hub unit rotates in one direction, the carrier unit rotates in the one direction.

3. The two-stage transmission of claim 1, further comprising a clutch unit installed between the electric motor unit and the sun gear unit and configured to control power delivered through the driving shaft unit.

4. The two-stage transmission of claim 3, further comprising a control unit configured to control operations of the first synchro unit, the second synchro unit, and the clutch unit.

5. The two-stage transmission of claim 1, wherein when the first synchro unit is disconnected from the carrier unit and the second synchro unit is coupled to the ring gear unit, a first shift stage is implemented.

6. The two-stage transmission of claim 1, wherein when the first synchro unit is connected to the carrier unit and the second synchro unit is decoupled from the ring gear unit, a second shift stage is implemented.

* * * * *